J. TREADWAY.
No. 121,825.
Improvement in Brick Machines.
Patented Dec. 12, 1871.
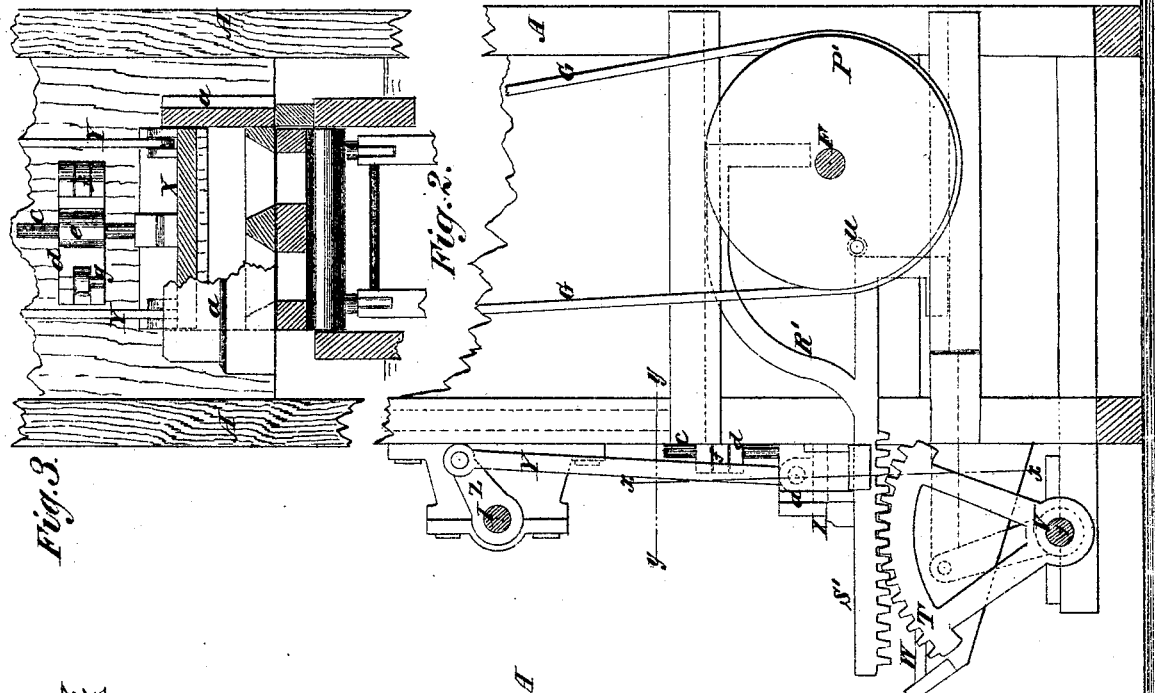
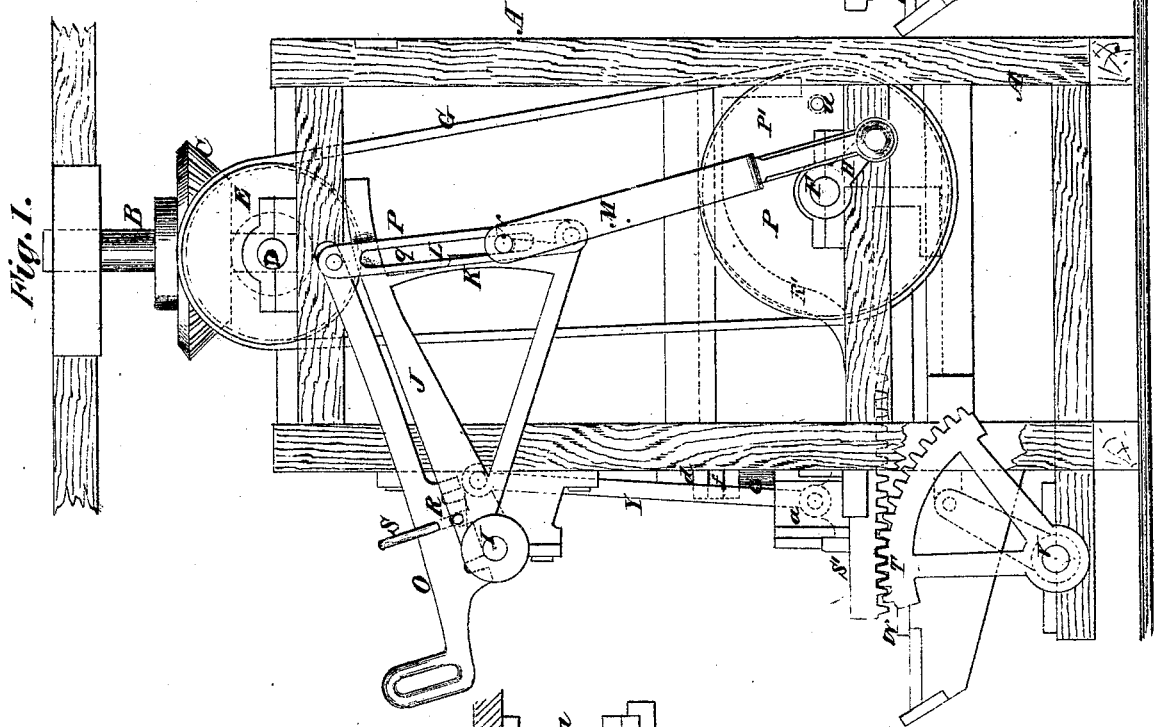
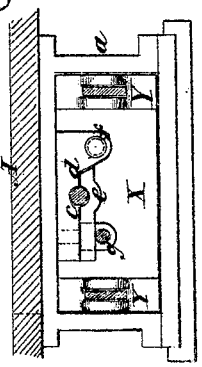
Witnesses:
Gustave Dieterich
Francis McArdle
Inventor:
J. Treadway
Per Munn & Co.
Attorneys.

UNITED STATES PATENT OFFICE.

JOHN TREADWAY, OF HAVERSTRAW, NEW YORK.

IMPROVEMENT IN BRICK-MACHINES.

Specification forming part of Letters Patent No. 121,825, dated December 12, 1871.

*To all whom it may concern:*

Be it known that I, JOHN TREADWAY, of Haverstraw, in the county of Rockland and State of New York, have invented a new and useful Improvement in Brick-Machines; and I do hereby declare that the following is a full, clear, and exact description thereof, which will enable others skilled in the art to make and use the same, reference being had to the accompanying drawing forming part of this specification.

My object in this invention is to improve and obviate objections to a machine for manufacturing bricks, which is already secured to me by Letters Patent of the United States; and it consists in the mechanism for varying the action of the presser and operating the follower, and in a joint-box for the presser-guide, as I will proceed to describe.

In the accompanying drawing, Figure 1 is a side elevation of the machine, showing the mode of varying and intermitting the action of the presser. Fig. 2 is a vertical section of the machine with the outside mechanism removed, showing the mechanical devices for operating the follower, which pushes out the brick-molds. Fig. 3 is a vertical section of Fig. 2 taken on the line $x\ x$. Fig. 4 is a horizontal section of Fig. 2 on the line $y\ y$.

Similar letters of reference indicate corresponding parts.

A represents the frame of the machine, which incloses the pug-mill for preparing the clay, and the ordinary device for forcing the clay down into the brick-molds. B is the pug-mill or driving-shaft, from which all the operating parts of the machine receive their motion. The bevel-wheel C on the main shaft meshes into a wheel on the horizontal shaft D. E is a pulley on the shaft D. F is another horizontal shaft, which receives its motion from the pulley E by a belt, G. H is a crank on the end of the shaft F. I is the presser-shaft, extending horizontally across the front side of the machine. J is an arm on the end of the shaft I, made in two parts, connected together by the upright bar K. This bar K has notches L, one or more, in its edge, as seen in Fig. 1. M is a forked connecting-rod, one end of which is connected with the wrist of the crank H. Through the forked end is a pin, N, which engages with the notch or notches L in the bar K. As the crank H revolves the power to the presser-shaft is thus applied, the shaft being rocked for pressing the brick whenever the pin N in its descent is brought in contact with one of the notches L. The positions of the pin N and the end of the connecting-rod are controlled by the shifting-bar O by means of two slotted plates P, one on each side of the arm J and notched bar K. $q$ is the slot in each of these plates. As the connecting-rod is thrown up and down by the crank the pin N works in the slots. The two plates P are pivoted to the bottom end of the notched bar K, and also to the end of the shifting-bar O. This bar O may be shoved inward or pulled outward, and it is held in any desired position by means of notches R and the guide S, seen in Fig. 1. When the rod O is pushed in it throws the pin N either from one to another of the notches L or from the notches entirely. Starting from the upper notch, which gives the greatest amount of pressure to the brick, the bar may be pushed inward, so that the pin will engage with the next notch below, which gives the brick less pressure, and so on, let there be more or less notches; and when pushed inward so as to disengage the pin from all the notches the connecting-rod and pin will work up and down without moving the presser-shaft. By means of the shifting-bar O the presser-shaft is made to rock more or less, or to instantly stand still, as may be desired, while the crank revolves without cessation. P' is a pulley on the crank-shaft F. R' is a cam with a projecting rack-bar, S', which bar engages with the sector-wheel T. The cam is thrown back and forth by means of a pin in the pulley P', seen at U. The sector-wheel is on the end of the horizontal shaft V, upon which shaft are two arms, which are connected with the follower, and as the shaft V is rocked by the movement of the cam-rack S' on the sector-wheel T the follower is moved back and forth, shoving out onto the apron W the brick-molds from beneath the presser. The arm on the shaft V, and the rods which connect them with the follower, are seen in dotted lines in Figs. 1 and 2. The presser is seen at X, Fig. 4, and is operated vertically by means of the rods Y Y connected therewith at their lower ends, and with the arms Z Z on the presser shaft at their other ends. $a$ is the presser-casing, beneath which the brick-molds are shoved out by the follower with the proper quantity of clay therein. The next movement of the follower shoves the mold, with the pressed brick, out from beneath the presser, and puts another mold filled with clay in its place. The molds, with the pressed brick, are removed as fast as they are pressed. This part of the operation is the same as in my patented machine, and forms no part of my present invention; but there is one feature of the presser which I do claim as new, and that is confining the guide-rod $c$ of the presser by a clamp-box, $d$, instead of the ordinary journal-box confined to the side of the mill by bolts. The cap $e$ of this box is jointed to the bed, as seen at $f$, and is fastened by a hasp and pin, $g$. While this guide keeps the presser tightly up to the side of the mill the cap is readily removed, so that the presser may be taken out in case a stone or other obstruction, combined with the clay interferes with its proper operation. By the old plan screw-nuts have to be removed and much time lost in taking out the presser. The motion of the cam R' by which the follower is operated, and the motion of the arms J by which the presser is operated, are both regulated so as to act in unison, or at the precise moment of time required. Should any accident occur the belt G will slip; but that will not derange or alter the motions referred to, as they are both driven from the same shaft. Gear-wheels have heretofore been used to impart motion from the pulley-shaft D to the crank-shaft F, with which arrangement breakages are frequent. By the belt-connection all danger is avoided.

Having thus described my invention, I claim as new and desire to secure by Letters Patent—

1. The arm J and bar K provided with notches L, in combination with connecting-rod M, pin N, slotted plates P P, and shifting-bar O, substantially as and for the purposes set forth.

2. The joint-box $d$, in combination with the guide-rod $c$ and presser-plate X, substantially as and for the purpose described.

3. The cam R', rack S', sector-wheel T, pulley P'', and pin U, arranged to operate substantially as and for the purposes described.

JOHN TREADWAY.

Witnesses:
 CHARLES WALDRON,
 JAMES WALDRON.